US010150499B2

United States Patent
Tomizawa et al.

(10) Patent No.: US 10,150,499 B2
(45) Date of Patent: Dec. 11, 2018

(54) DRIVING UNIT AND ELECTRIC POWER STEERING SYSTEM

(71) Applicant: DENSO CORPORATION, Kariya (JP)

(72) Inventors: Hiroki Tomizawa, Kariya (JP); Koji Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/189,174

(22) Filed: Jun. 22, 2016

(65) Prior Publication Data

US 2017/0066471 A1 Mar. 9, 2017

(30) Foreign Application Priority Data

Sep. 4, 2015 (JP) .................................. 2015-174674

(51) Int. Cl.
*B62D 5/04* (2006.01)
*H02K 5/10* (2006.01)
*H02K 7/10* (2006.01)

(52) U.S. Cl.
CPC ............ *B62D 5/0424* (2013.01); *H02K 5/10* (2013.01); *H02K 7/1004* (2013.01); *H02K 2213/03* (2013.01)

(58) Field of Classification Search
CPC ............................. B62D 5/0424; H02K 5/124
USPC ........................................................ 180/444
See application file for complete search history.

(56) References Cited

U.S. PATENT DOCUMENTS

| 1,370,803 | A | * | 3/1921 | Fesler | F16N 31/00 184/105.2 |
| 3,934,311 | A | * | 1/1976 | Thompson | A47G 21/067 277/563 |
| 6,172,436 | B1 | * | 1/2001 | Subler | F16C 33/6662 29/898.11 |
| 8,627,918 | B2 | * | 1/2014 | Sekine | B62D 5/0406 180/444 |
| 9,321,478 | B2 | * | 4/2016 | Webber | B62D 5/0424 |
| 2007/0075500 | A1 | * | 4/2007 | Bookout | F16J 15/164 277/411 |
| 2015/0217797 | A1 | * | 8/2015 | Sin | B62D 5/0403 180/444 |
| 2015/0266502 | A1 | * | 9/2015 | Watanabe | B62D 5/0424 180/444 |
| 2017/0104383 | A1 | * | 4/2017 | Fujisaki | B62D 5/0424 |

FOREIGN PATENT DOCUMENTS

| JP | 2007-046653 A | 2/2007 |
| JP | 2015-093512 A | 5/2015 |

* cited by examiner

Primary Examiner — Tony H Winner

(57) ABSTRACT

A driving unit includes a stator, a rotor, a shaft, a housing, a protrusion, a small pulley, and a sealing member. The rotor is rotatably disposed relative to the stator. The shaft rotates together with the rotor. The housing houses the stator and the rotor. The protrusion protrudes from an outer surface of the housing toward an outside of the housing. The outer surface is positioned at one side of the housing in an axial direction of the rotor. The small pulley is disposed at an end of the shaft protruding toward the outside of the housing through a hole formed in the protrusion. The small pulley is cylindrical shaped. The sealing member seals a space between an inner surface of the hole of the protrusion and an outer surface of the shaft.

4 Claims, 4 Drawing Sheets

UPPER SIDE
↑
↓
LOWER SIDE

UPPER SIDE
↑
↓
LOWER SIDE

DRIVING UNIT AND ELECTRIC POWER STEERING SYSTEM

CROSS REFERENCE TO RELATED APPLICATION

This application is based on reference Japanese Patent Application No. 2015-174674 filed on Sep. 4, 2015, the disclosure of which is incorporated herein by reference.

TECHNICAL FIELD

The present disclosure relates to a driving unit and an electric power steering system using the driving unit.

BACKGROUND

Conventionally, there has been known an electric power steering system that assists steering operation by a driver.

An electric power steering system disclosed in Patent Literature 1 (JP 2015-93512 A) includes a rack housing, which houses a rack shaft and a ball screw mechanism disposed in the rack shaft, and a motor, which is fixed to the rack housing. A motor shaft protruding from a motor case is inserted into the rack housing. Inside the rack housing, a belt is wound between a pulley fixed to an end of the motor shaft and the ball screw mechanism. A torque of the motor is transferred to the rack shaft from the motor shaft through the pulley, the belt, and the ball screw mechanism. As a result, steering operation by a driver is assisted by the torque of the motor.

The electric power steering system includes a first annular packing and a second annular packing disposed at a connection point of the rack housing and the motor case. The first packing and the second packing prevent water (hereinafter "impure water") containing foreign matter such as sand and mud from entering into an inside of the rack housing from an outside thereof.

However, there may be concern in the electric power steering system recited in Patent Literature 1 about entry of the impure water into the inside of the rack housing through worn boots that are disposed at both ends of the rack housing and worn out due to an impact by foreign matter during vehicle operation or due to aged deterioration. In this case, the impure water collected inside the rack housing may further enter into the motor case through a hole of the motor case into which the motor shaft is inserted. As a result, mechanical locking or electrical short due to rust generated inside the motor may occur.

In a case where the motor integrally has a controller that controls energization of the motor, there may be concern about occurrence of a variety of troubles such as stop of the electric power steering system.

In view of the above, it is an objective of the present disclosure to provide a driving unit that prohibits enter of the impure water containing water and foreign matter and to provide an electric power steering system using the driving unit.

SUMMARY

In a first aspect of the present disclosure, a driving unit includes a stator, a rotor, a shaft, a housing, a protrusion, a small pulley, and a sealing member. The rotor is rotatably disposed relative to the stator. The shaft rotates together with the rotor. The housing houses the stator and the rotor. The protrusion protrudes from an outer surface of the housing toward an outside of the housing. The outer surface is positioned at one side of the housing in an axial direction of the rotor. The small pulley is disposed at an end of the shaft protruding toward the outside of the housing through a hole formed in the protrusion. The small pulley is cylindrical shaped. The sealing member seals a space between an inner surface of the hole of the protrusion and an outer surface of the shaft.

Accordingly, the impure water drops along the outer circumferential surface of the protrusion, when the impure water is brought into contact with the outer surface positioned at the one side of the housing in the axial direction of the rotor, and then the impure water goes down under gravity along the outer surface of the housing. Therefore, entry of the impure water into the hole of the protrusion can be prohibited. As a result, contact of the impure water on the sealing member that is disposed inside the hole of the protrusion is suppressed, whereby wear of the sealing member due to foreign matter contained in the impure water can be suppressed. Thus, the entry of the impure water into the housing can be prohibited according to the driving unit.

In a second aspect of the present disclosure, an electric power steering system including the driving unit includes a gear mechanism, a gear housing, an opening portion, and a belt. The gear housing houses the gear mechanism. The opening portion is formed in the gear housing. The outside surface of the housing is disposed at the opening portion. The belt is wound between the driving transfer member and the gear mechanism.

Accordingly, the electric power steering system according to the second aspect can achieve similar operation and effects as the first aspect.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a plurality of embodiments of the present disclosure will be described in detail. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

Figure 1:
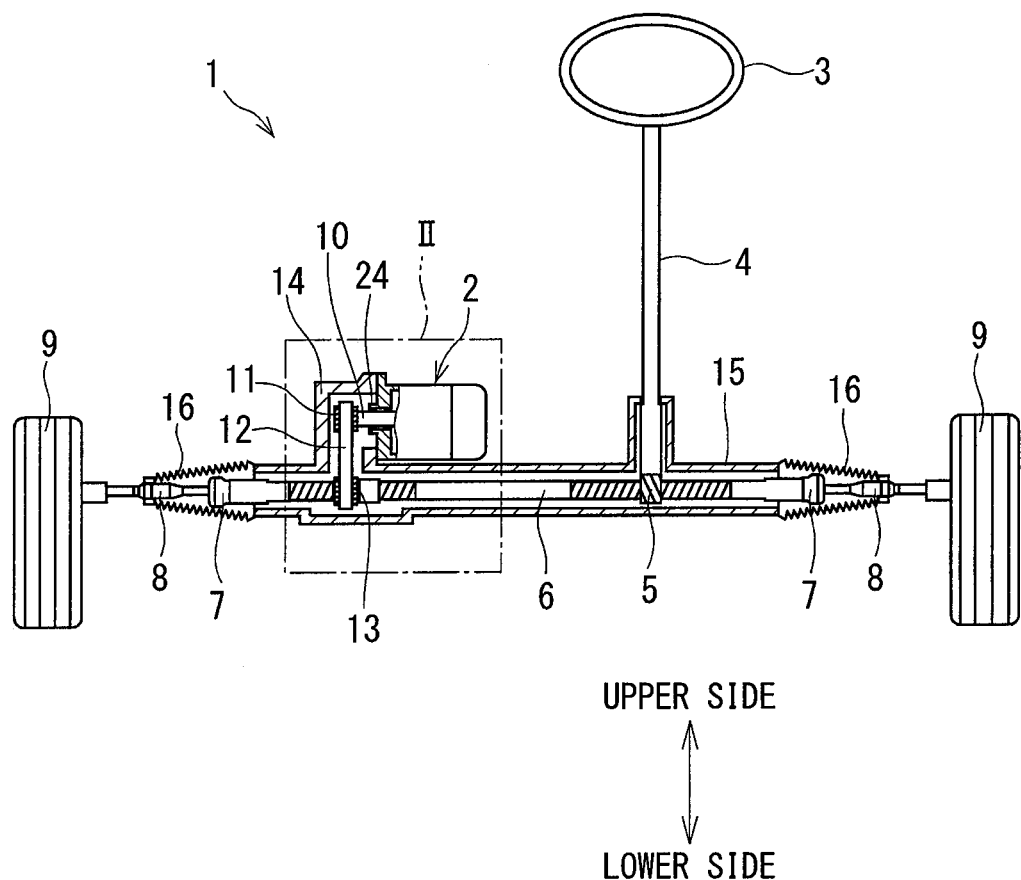
FIG. 1 is a diagram schematically illustrating an electric power steering system according to a first embodiment.
Figure 2:
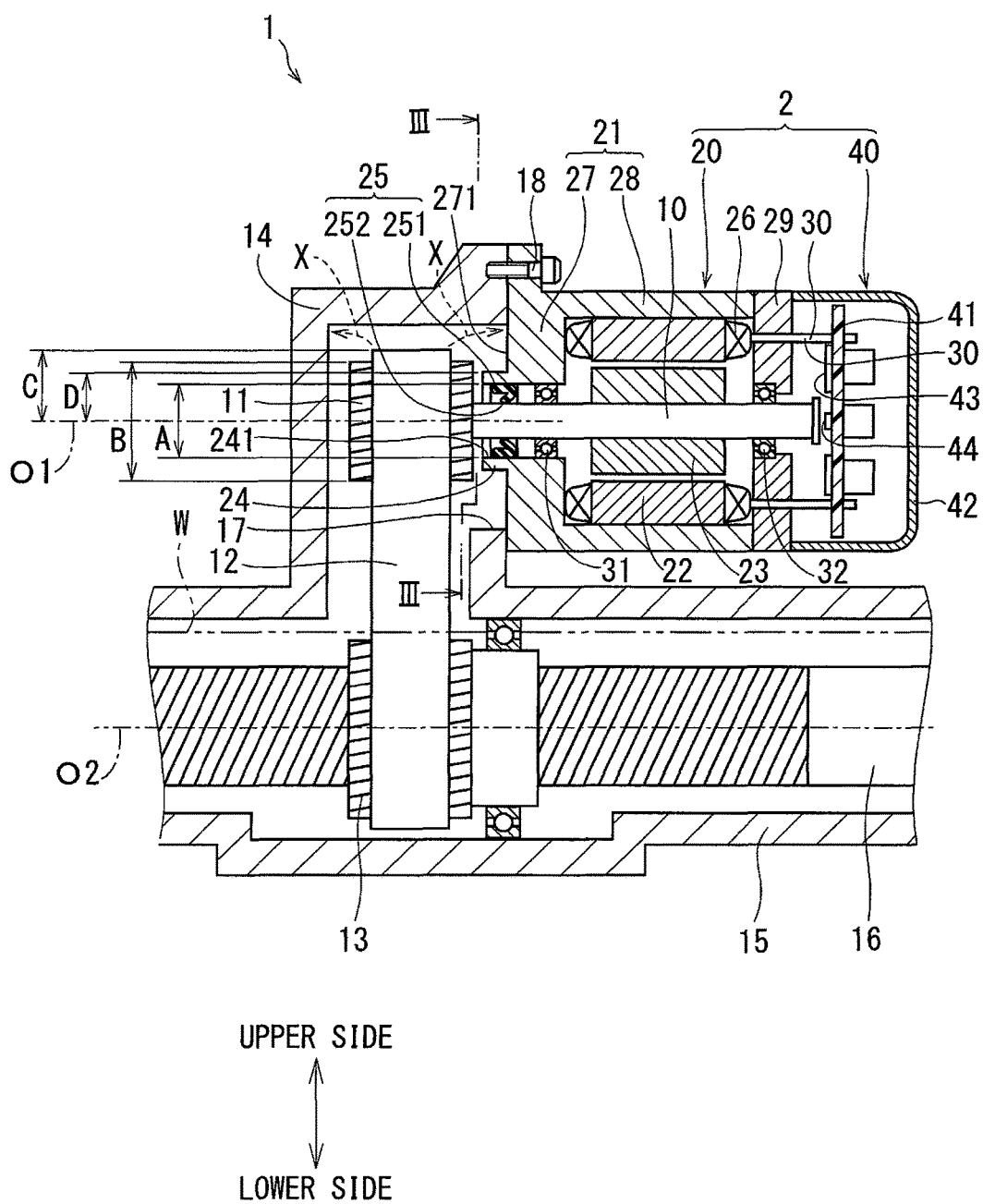
FIG. 2 is an enlarged view indicated by the two-dot line II in FIG. 1.
Figure 3:
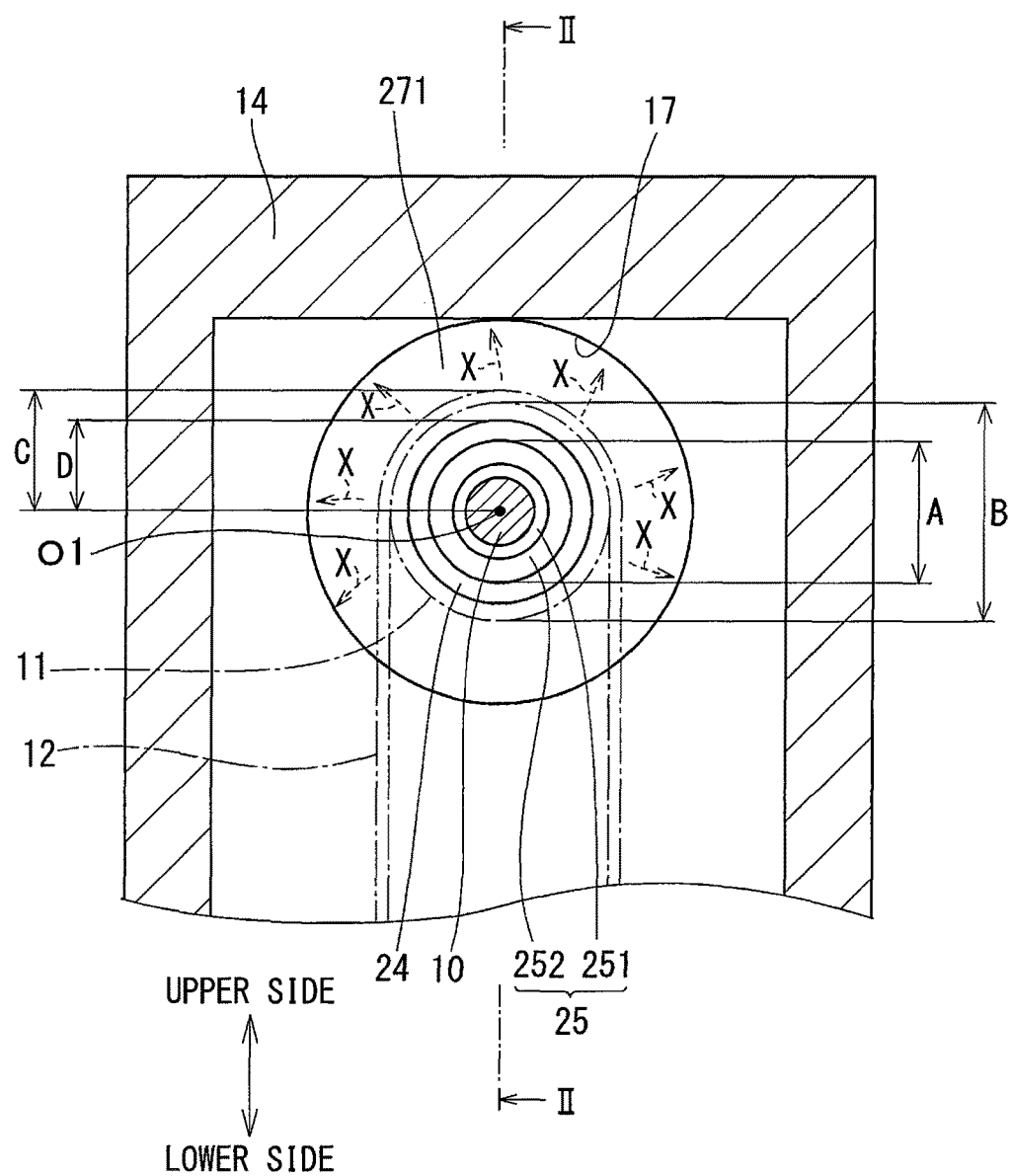
FIG. 3 is a cross-section view taken along line in FIG. 2.

Referring to FIGS. 1 to 3, the present disclosure according to a first embodiment will be described. An electric power steering system 1 in the first embodiment assists steering operation of a driver by a torque of a driving unit 2.

As shown in FIG. 1, rotational motion by steering a wheel 3 by a driver is transferred to a pinion gear 5 from a steering shaft 4, and then is converted into linear motion of a rack shaft 6 that engages with the pinion gear 5. Steering wheels 9 are connected to both ends of the rack shaft 6 through ball joints 7 and tie rods 8. The Steering wheels 9 are operated according to an amount of displacement along an axial direction of the rack shaft 6.

The driving unit 2 outputs a torque applied to the steering shaft 4 when a driver operates the wheel 3, and a torque for assisting steering operation based on information of a vehicle speed. The torque of the driving unit 2 is transferred to a large pulley 13 disposed in the rack shaft 6 from a small pulley 11 fixed to a shaft 10 of the driving unit 2 through a belt 12. A toque of the large pulley 13 is converted into linear motion of the rack shaft 6 by non-illustrated ball screw mechanism disposed radially inward of the large pulley 13. As a result, the driving unit 2 can assist steering operation by a driver.

The small pulley 11 of the present embodiment may be one example of a "power transfer member". The large pulley 13 and the ball screw mechanism of the present embodiment may be one example of a "gear mechanism".

The small pulley 11, the belt 12, the larger pulley 13, and the ball screw mechanism are housed in a housing 14. The rack shaft 6 is housed in a rack housing 15 having a substantially cylindrical shape. The gear housing 14 and the rack housing 15 may be integrally formed, or may be separately formed. Boots 16 are disposed at both ends of the rack housing 15. Each boot 16 is formed of resin or gum and has a bellow shape. Each of the boots 16 holds a grease therein and prohibits water (impure water) containing foreign matter such as sand and mud from entering into the rack housing 15 and the gear housing 14 from an outside thereof.

As shown in FIG. 2, the driving unit 2 includes a motor 20 and a controller 40 that are integrated into each other. The motor 20 is, for example, a brushless motor, and includes a housing 21, a stator 22, a rotor 23, a shaft 10, a protrusion 24, and an oil seal 25 as a sealing member.

The controller 40 includes a cover 42 and a substrate 41 on which control circuits are formed. The control circuits include an inverter circuit, a microcomputer 43, and a rotational angle sensor 44. The controller 40 controls energization of a coil 26 wound around the stator 22 or the rotor 23.

The driving unit 2 of the present embodiment is arranged such that a central axis O1 of the shaft 10 is positioned upward of, in gravity, a central axis O2 of the large pulley 13 disposed in the rack shaft 6. In FIGS. 1 to 3, the arrow indicates a direction in gravity.

Although the small pulley 11 is positioned directly above the large pulley 13 in FIGS. 1 to 3, the small pulley 11 may be positioned diagonally upward of the large pulley 13.

The driving unit 2 is arranged such that the central axis O1 of the shaft 10 is angled relative to the direction in gravity when the driving unit 2 is mounted on a vehicle.

The housing 21 is formed to have a cylindrical shape with a bottom, and includes a frame end 27, which has a circular shape, and a motor case 28, which has a cylindrical shape and is connected to an outside edge of the frame end 27. The housing 21 may be configured by integrally or separately forming the frame end 27 and the motor case 28. A separator 29 is fixed to the motor case 28 at a position close to the controller 40. The separator 29 separates the motor 20 from the controller 40.

The stator 22 is formed of magnetic material to have a cylindrical shape. The stator 22 is fixed to an inside of the motor case 28. The coil 26 is wound around a plurality of slots (not shown) arranged along a circumferential direction of the stator 22. A pulled line 30 pulled out from the coil 26 is electrically connected to the control circuit formed on the substrate 41 of the controller 40. When the coil 26 is energized through the pulled line 30 of the control circuit, the stator 22 generates a rotational magnetic field for rotating the rotor 23.

The rotor 23 is formed of magnetic material to have a cylindrical shape and is disposed radially inward of the stator 22. The rotor 23 is magnetized to have magnetic poles having opposite polarities that are alternately arranged along the circumferential direction of the rotor 23. The rotor 23 is rotatable relative to the stator 22 and rotates in both directions according to the rotational magnetic field generated at the stator 22.

The shaft 10 is fixed to the rotational center of the rotor 23. An outputting side end of the shaft 10 is rotatably supported by a bearing 31 disposed in the frame end 27, whereas an opposite end of the shaft 10 close to the controller 40 is rotatably supported by a bearing 32 disposed in the separator 29. As a result, the shaft 10 rotates together with the rotor 23.

The housing 21 of the driving unit 2 is fixed by a bolt 18 at an opening (opening portion) 17 formed in the gear housing 14. An outside surface 271 of the frame end 27, which is positioned at one side of the frame end 27 in an axial direction of the rotor 23 (hereinafter, referred to as "the outside surface 271 of the frame end 27"), is exposed to an inside space of the gear housing 14 through the opening 17 of the gear housing 14.

A protrusion 24 is disposed in the outside surface 271 of the frame end 27. The protrusion 24 has a cylindrical shape and protrudes from a center portion of the outside surface 271 to an internal space of the gear housing 14 (i.e., an outside of the housing 21). The protrusion 24 has a hole 241 passing through the protrusion 24 in an axial direction thereof. The shaft 10 is inserted into the hole 241 of the protrusion 24.

The oil seal 25 is disposed around an internal surface of the hole 241 of the protrusion 24. The oil seal 25 includes a cylindrical seal body 251 and a rip 252 inwardly extending in a radial direction from the seal body 251. The seal body 251 is fixed to the internal surface of the hole 241 of the protrusion 24 by fitting. The rip 252 is in slidably contact with the outside surface of the shaft 10. As a result, the oil seal 25 prevents oil from leaking into an internal space of the gear housing 14 from an inside of the housing 21. The oil seal 25 further prevents the impure water from entering into an inside of the housing 21 from the internal space of the gear housing 14.

The small pulley 11 is fixed to an end of the shaft 10 that is exposed to the internal space of the gear housing 14 through the hole 241 of the protrusion 24 disposed in the outer surface 271 of the frame end 27. The belt 12 is wound between the small pulley 11 and the large pulley 13 disposed in the rack shaft 6. The belt 12 transfers powers between the small pulley 11 and the large pulley 13. In FIG. 3, the small pulley 11 and the belt 12 are illustrated by one-dot lines.

As shown in FIGS. 2 and 3, an inner diameter of the hole 241 of the protrusion 24 and an outer diameter of the small pulley 11 are defined as A and B, respectively. In the present embodiment, A and B are set as A<B.

Further, a distance between an outer circumferential surface of a portion of the belt 12 that is wound around the small pulley 11 and a central axis O1 of the shaft 10 is defined as C, and a distance between an outer circumferential surface of the protrusion 24 and the central axis O1 of the shaft 10 is defined as D. In this case, C and D are set as C>D.

Here, a situation where the boots 16 disposed at the both end of the rack housing 15 are worn out due to an impact by foreign matter during vehicle operation or due to aged deterioration will be discussed below. In this case, when entry of water into a vehicle occurs, for example, the impure water enters into through the worn portion of the boots 16 and, as a result, the rack housing 15 submerges up to the position indicated by the two-dot line W in FIG. 2. When the driving unit 2 starts operation under such a situation, the impure water is scooped up by the belt 12, and then the impure water is scattered radially outward of the small pulley 11 due to a centrifugal force, as indicated by the arrows X in FIGS. 2 and 3. As a result, the impure water is brought into contact on the outside surface 271 of the frame end 27.

However, the outer diameter B of the small pulley 11 is greater than the inner diameter A of the hole 241 of the protrusion 24, and therefore the impure water scattered from the small pulley 11 can be suppressed to directly reach to the oil seal 25 inside the hole 241 of the protrusion 24.

Furthermore, the distance C between the outer circumferential surface of the belt 12 and the central axis O1 of the shaft 10 is greater than the distance D between the outer circumferential surface of the protrusion 24 and the center axis O1 of the shaft 10. Therefore, the impure water scattered from the belt 12 is suppressed to directly reach to the outer circumferential surface of the protrusion 24. In other words, the direct contact of the impure water on the oil seal 25 disposed in the inner surface of the hole 241 of the protrusion 24 can be effectively suppressed.

The impure water on the outer surface 271 of the frame end 27 drops under gravity along the outer surface 271. In this case, entry of the impure water into the hole 241 of the protrusion 24 can be suppressed because the impure water falls along the outer circumferential surface of the protrusion 24. Thus, contact of the impure water on the oil seal 25 can be further suppressed. Accordingly, advancement of abrasion of the rip 252 of the oil seal 25 and the shaft 10 due to foreign material contained in the impure water can be suppressed according to the driving unit 2.

The driving unit 2 and the electric power steering system 1 according to the present embodiment can provide operation and effects as below.

The driving unit 2 of the first embodiment includes the protrusion 24 that protrudes from the outer surface 271 of the frame end 27 toward an outside of the frame end 27. The oil seal 25 seals a space between the inner surface of the hole 241 of the protrusion 24 and the outer surface of the shaft 10.

Accordingly, when the impure water reaches to the outer surface 271 of the frame end 27 and then drops under gravity along the outer surface 271, the impure water can be suppressed to enter into the hole 241 of the protrusion 24 since the impure water falls along the outer circumferential surface of the protrusion 24. As a result, contact of the impure water on the oil seal 25 disposed inside the hole 241 of the protrusion 24 can be suppressed, and thus abrasion of the rip 252 of the oil seal 25 and the shaft 10 due to foreign material contained in the impure water can be suppressed. Hence, the driving unit 2 can prevent the impure water from entering into the housing 21.

In the first embodiment, the inner diameter A of the hole 241 of the protrusion 24 is less than the outer diameter B of the small pulley 11.

Thus, even if the impure water is scooped up by the belt 12 wound around the small pulley 11, direct contact of the impure water on the oil seal 25 can be suppressed because the impure water is scattered radially outward of the small pulley 11 due to a centrifugal force.

In the first embodiment, the driving unit 2 includes the controller 40 that controls energization of the stator 22 or the rotor 23.

Accordingly, in the integrated-type driving unit 2 having integrally the motor 20 and the controller 40, entry of the impure water into the housing 21 and the controller 40 can be prohibited. Therefore, occurrence of a variety of troubles such as stop of the electric power steering system 1 due to, e.g., malfunction of the control circuit of the controller 40 can be avoided.

In the electric power steering system 1 of the first embodiment, the distance C between the outer circumferential surface of the belt 12 that is wound around the small pulley 11 and the center axis O1 of the shaft 10 is greater than the distance D between the outer circumferential surface of the protrusion 24 and the center axis O1 of the shaft 10.

Accordingly, even if the impure water is scooped up by the belt 12 wound around the small pulley 11, direct contact of the impure water on the outer circumferential surface of the protrusion 24 can be suppressed because the impure water is scattered radially outward of the belt 12 due to a centrifugal force.

Second Embodiment

Figure 4:
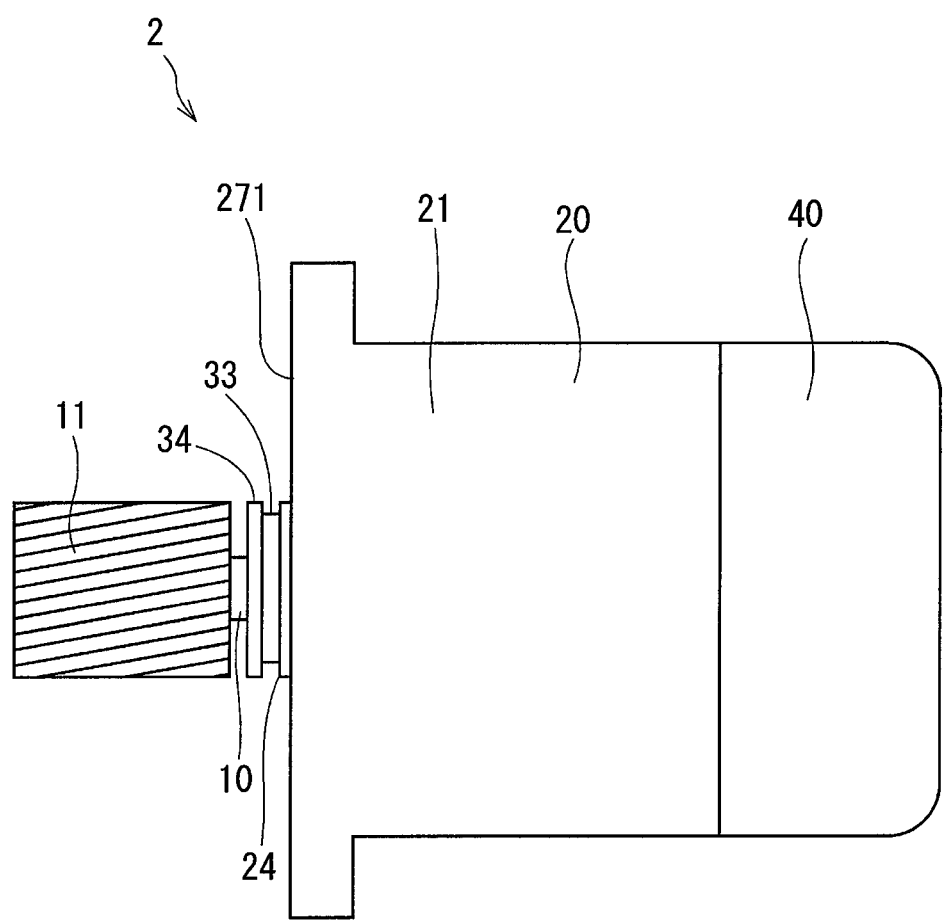
FIG. 4 is a side view of a driving unit according to a second embodiment.

A second embodiment of the present disclosure will be described below with reference to FIG. 4. The driving unit 2 of the second embodiment includes a groove 33 annularly formed on the outer circumferential surface of the protrusion 24. In this configuration, the protrusion 24 includes a flange 34 that outwardly protrudes from the outer circumferential surface of the protrusion 24 such that the flange 34 has an annular shape.

In a case where the driving unit 2 of the second embodiment is applied to the electric power steering system 1 as described in the first embodiment, a situation where the impure water enters into the gear housing 14 through a worn portion of the boots 16 will be described. When the driving unit 2 starts operation under such a situation, the impure water is scooped up by the belt 12 and then reaches to the outer surface 271 of the frame end 27. In the second embodiment, when the impure water on the outer surface 271 drops under gravity, the impure water falls along the groove 33.

In the second embodiment, when the impure water on the outer surface 271 falls along the outer circumferential surface of the protrusion 24 or the groove 33, the impure water is suppressed to enter into the hole 241 of the protrusion 24 from the outer circumferential surface 24 over the flange 34. As a result, entry of the impure water into the hole 241 of the protrusion 24 can be suppressed according to the driving unit 2. Thus, abrasion of the rip 252 of the oil seal 25 and the shaft 10 due to foreign material contained in the impure water can be suppressed, and as a result, entry of the impure water into the housing 21 can be suppressed.

Other Embodiments

In the above-described embodiments, the driving unit 2 that assists steering operation of a driver by transferring a torque to the rack shaft 6 of a vehicle. Alternatively, steering operation of a driver may be assisted by transferring a torque to a column shaft of a vehicle.

In the above-described embodiments, a blushless motor is used as the motor 20 of the driving unit 2. Alternatively, a blush motor in which a coil is wound around a rotor may be used as the motor 20 of the driving unit 2.

The outer diameter of the protrusion 24 may be less than the outer diameter B of the small pulley 11. In such a configuration, direct contact of the impure water scattered from the small pulley 11 on the outer circumferential surface of the protrusion 24 can be suppressed. In other words, direct contact of the impure water on the oil seal 25 inside the hole 241 of the protrusion 24 can be suppressed.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A driving unit comprising:
   a stator;
   a rotor that is rotatably disposed relative to the stator;
   a shaft that rotates together with the rotor;
   a housing that houses the stator and the rotor;
   a protrusion that protrudes from an outer surface of the housing toward an outside of the housing, the outer surface being positioned at one side of the housing in an axial direction of the rotor;
   a groove that is annularly formed on an outer circumferential surface of the protrusion;
   a power transfer member that is disposed at an end of the shaft protruding toward the outside of the housing through a hole formed in the protrusion, the power transfer member being cylindrical shaped; and
   a sealing member that is inserted into the protrusion and located inside the hole, the sealing member sealing a space between an inner surface of the hole of the protrusion and an outer surface of the shaft, wherein
   the hole of the protrusion has an inner diameter, at a position where the sealing member is located, less than an outer diameter of the power transfer member.

2. The driving unit according to claim 1, further comprising:
   a controller that is fixed to the housing, the controller controlling energization of a coil that is wound around the stator or the rotor.

3. A driving unit comprising:
   a stator;
   a rotor that is rotatably disposed relative to the stator;
   a shaft that rotates together with the rotor;
   a housing that houses the stator and the rotor;
   a protrusion that protrudes from an outer surface of the housing toward an outside of the housing, the outer surface being positioned at one side of the housing in an axial direction of the rotor;
   a flange that outwardly protrudes from an outer circumferential surface of the protrusion, the flange extending annularly;
   a power transfer member that is disposed at an end of the shaft protruding toward the outside of the housing through a hole formed in the protrusion, the power transfer member being cylindrical shaped; and
   a sealing member that is inserted into the protrusion and located inside the hole, the sealing member sealing a space between an inner surface of the hole of the protrusion and an outer surface of the shaft, wherein
   the hole of the protrusion has an inner diameter, at a position where the sealing member is located, less than an outer diameter of the power transfer member.

4. An electric power steering system comprising:
   a driving unit having
      a stator,
      a rotor that is rotatably disposed relative to the stator,
      a shaft that rotates together with the rotor,
      a housing that houses the stator and the rotor,
      a protrusion that protrudes from an outer surface of the housing toward an outside of the housing, the outer surface being positioned at one side of the housing in an axial direction of the rotor,
      a power transfer member that is disposed at an end of the shaft protruding toward the outside of the housing through a hole formed in the protrusion, the power transfer member being cylindrical shaped, and
      a sealing member that is inserted into the protrusion and located inside the hole, the sealing member sealing a space between an inner surface of the hole of the protrusion and an outer surface of the shaft, wherein
   the hole of the protrusion has an inner diameter, at a position where the sealing member is located, less than an outer diameter of the power transfer member;
   a gear mechanism;
   a gear housing that houses the gear mechanism;
   an opening portion that is formed in the gear housing, the outside surface of the housing being disposed at the opening portion; and
   a belt that is wound between the power transfer member and the gear mechanism, wherein
   a distance between an outer circumferential surface of the belt wound around the power transfer member and a center axis of the shaft is set to be greater than a distance between the outer circumferential surface of the protrusion and the center axis of the shaft.

* * * * *